United States Patent
Habibi et al.

(10) Patent No.: US 8,109,148 B2
(45) Date of Patent: Feb. 7, 2012

(54) PRESSURE COMPENSATION UNIT FOR USE IN A PRESSURE SENSOR

(75) Inventors: Masoud Habibi, Schwieberdingen (DE); Thomas Fessele, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 104 days.

(21) Appl. No.: 12/800,016

(22) Filed: May 5, 2010

(65) Prior Publication Data
US 2010/0288377 A1    Nov. 18, 2010

(30) Foreign Application Priority Data
May 15, 2009 (DE) .......................... 10 2009 003 149

(51) Int. Cl.
*G01L 19/04* (2006.01)
(52) U.S. Cl. ........................................................ 73/708
(58) Field of Classification Search .................. None
See application file for complete search history.

(56) References Cited

U.S. PATENT DOCUMENTS

| | | | | |
|---|---|---|---|---|
| 3,663,409 A | * | 5/1972 | Greene | 204/408 |
| 4,126,531 A | * | 11/1978 | Porter et al. | 204/408 |
| 7,568,395 B2 | * | 8/2009 | Silverbrook et al. | 73/729.2 |
| 2004/0182867 A1 | * | 9/2004 | Hochrainer et al. | 220/495.06 |
| 2011/0041594 A1 | * | 2/2011 | Eslami et al. | 73/114.43 |
| 2011/0167917 A1 | * | 7/2011 | Hurst et al. | 73/708 |

FOREIGN PATENT DOCUMENTS

| | | |
|---|---|---|
| DE | 10 2008 004 358 | 7/2009 |
| WO | WO 2009/089959 | 7/2009 |

OTHER PUBLICATIONS

Robert Bosch GmbH: "Sensoren im Kraftfahrzeug" (Sensors in Motor Vehicles), 2007 edition, pp. 74-76 and pp. 128-130.

* cited by examiner

*Primary Examiner* — Andre Allen
(74) *Attorney, Agent, or Firm* — Kenyon & Kenyon LLP

(57) ABSTRACT

A pressure compensation unit for use in a pressure sensor includes a housing which has at least one continuous channel, at least one opening being provided in a wall of the channel. The opening is connectable to a reference pressure chamber of the pressure sensor via at least one air passage in the housing. The opening is closed by at least one gas-permeable and preferably fluid-tight filter diaphragm.

10 Claims, 3 Drawing Sheets

PRESSURE COMPENSATION UNIT FOR USE IN A PRESSURE SENSOR

BACKGROUND OF THE INVENTION

1. Field of the Invention

The present invention relates to pressure sensors for detecting a pressure of a fluid and/or a gaseous medium.

2. Description of Related Art

Pressure sensors of the above-noted type are known from a variety of applications. Reference is made below, in particular, to applications in automotive engineering, for example pressure cells for intake manifold or boost pressures, brake pressures, air spring pressures, tire pressures, hydraulic reservoir pressures, shock absorber pressures, coolant pressures, modulation pressures in automatic transmissions, brake pressures, fuel tank pressures, or combustion chamber pressures. Reference is made, in particular, to applications in fuel tank pressure sensors for motor vehicles. In principle, however, other automotive or non-automotive applications are also possible. For possible pressure sensors in automotive engineering, reference may be made to Robert Bosch GmbH: "Sensoren im Kraftfahrzeug" (Sensors in Motor Vehicles), 2007 edition, pp. 74-76 and pp. 128-130. The pressure sensors described therein are also modifiable according to the present invention and may be equipped with a pressure compensation unit according to the present invention.

In many pressure sensors, in particular differential pressure sensors, a pressure difference is measured between a measuring chamber which is connected to a sensor element of the pressure sensor, directly or via a measured pressure supply means, and a reference pressure chamber. In pressure sensors of this type, a so-called pressure compensation unit is frequently required which is intended to compensate a pressure difference between the reference pressure chamber and the environment. In many fuel tank pressure sensors, for example, a fuel tank pressure is supplied to the back of a silicon diaphragm from below, while a pressure present in the environment acts upon the front of the silicon diaphragm from above, for example through an opening in a sensor housing. However, to protect the front of the silicon diaphragm against environmental influences such as water and/or contaminants, the pressure compensation unit has a gas-permeable filter diaphragm which is built into a reference pressure opening. This filter diaphragm of a gas-permeable design is used as a pressure compensation element, is ordinarily designed to be water-repellent and impermeable to fluids, and is used to seal the reference pressure opening of the fuel tank pressure sensor of the built-in fuel tank unit, for example against fluids. This approach is intended to prevent spray water, for example, as well as other fluid or solid media, from entering the reference pressure chamber, regardless of the installation position of the pressure compensation element. An example of a pressure compensation unit of this type is described in the published German Patent Application DE 10 2008 004 358. This publication describes a pressure compensation unit having a housing cover and a gas-permeable filter diaphragm which covers an air opening. The pressure compensation unit includes a cap-shaped cover element which covers the filter diaphragm.

A technical challenge of known pressure compensation units is the fact that pressure compensation units require a large installation space. However, it is not possible to reduce the size in many cases, since size reductions may cause capillary effects to occur in the openings of the pressure compensation unit, through which liquids and/or contaminants, in turn, may collect in and adhere to the pressure compensation unit, which might impair the functionality.

BRIEF SUMMARY OF THE INVENTION

In accordance with the present invention, a pressure compensation unit for use in a pressure sensor as well as a pressure sensor for detecting a pressure in a measuring chamber are provided, which at least largely avoid the disadvantages of known pressure compensation units and pressure sensors. In particular, the pressure compensation unit may be used in a difference pressure sensor and/or in a fuel tank pressure sensor of a motor vehicle, although other applications are also possible, as noted above.

The pressure compensation unit includes a housing having at least one continuous channel. For example, this channel may be designed as a straight or bent channel. The channel may have, for example, two or more openings, so that an ambient medium, for example ambient air, may flow freely through the channel in at least one direction. At least one opening, for example a round or polygonal opening, is provided in a wall of the channel. This opening is connectable and/or is connected to a reference pressure chamber of the pressure sensor via at least one air passage in the housing. The reference pressure chamber of the pressure sensor may also be provided entirely or partially in the housing of the pressure compensation unit; however, it may also be accommodated entirely or partially in other components of the pressure sensor. The air passage may include, for example, one or more gaps, channels, openings or a combination of the aforementioned elements and/or other elements which enable pressure to be compensated between the reference pressure chamber and the opening and/or the channel.

The opening is closed by at least one gas-permeable and preferably fluid-tight filter diaphragm. For example, this diaphragm may be a flexible plastic diaphragm or a natural diaphragm. The filter diaphragm may, for example, have a porous design and/or be designed to have openings which, on the one hand, permit the passage of gases, in particular ordinarily air and/or gaseous organic media, while, on the other hand, at least largely preventing the entry of fluids, in particular water. It being also possible in turn to provide multiple filter diaphragms, the filter diaphragm may be connected, for example, to the housing in the area of the at least one opening, for example it may be glued to the housing and/or connected thereto in a force-locking and/or form-locking manner. For example, the diaphragm may be glued onto an edge of the housing in such a way that the at least one opening is closed.

The filter diaphragm may be covered, for example, by at least one cover element, for example by a cap-shaped cover element. This cover element may be formed as a single piece with the rest of the housing; however, it may also be merely connectable to the housing, for example using a force-locking and/or form-locking connection. In principle, other types of connections are also possible as an alternative or in addition. For example, the cover element may include a cover of a flat or curved design.

The air passage may be formed in different ways, and it may include, for example, the aforementioned elements or combinations of these elements and/or other elements. The air passage may also be assembled from multiple sections. Thus, the air passage may be formed, in particular, at least partially by at least one gap and/or by at least one air channel between the filter diaphragm and the cover element. However, the filter diaphragm rests at least partially on the cover element, preferably over a wide area, so that the filter diaphragm may be at least partially supported on the cover element. As an alternative or in addition, the air passage may further include an air opening in the housing. For example, this air opening may be designed in such a way that it directly or indirectly connects the at least one gap and/or the at least one air channel between the filter diaphragm and the cover element to the reference pressure chamber.

As described above, the filter diaphragm may be connected to the housing, in particular, in the area of the opening. For example, the filter diaphragm may be attached to a flat surface of an elevation, in particular a dome-shaped elevation, to which at least one cover element, in particular a cap-shaped cover element, is attachable, in particular latchable, according to the specific embodiment described above. A dome-shaped elevation may be generally understood to be an elevation in the housing of the pressure compensation unit.

As described above, the reference pressure chamber may be situated at least partially in the housing and/or at least partially in other components of the pressure sensor. In particular, the reference pressure chamber may be situated at least partially beneath the channel in a direction laterally to the direction of the longitudinal extension of the channel. This design may be implemented in a particularly installation space-saving manner. The opening may be situated, for example, on a side of the channel which is diametrically opposite the reference pressure chamber, the air passage at least partially enclosing the channel within the housing. As illustrated above, the air passage in this enclosure may include, for example, the aforementioned gap and/or air channel between the filter diaphragm and the cover element as well as, if necessary, the at least one air opening.

The housing of the pressure compensation unit may be designed, in particular, at least partially as a cover, i.e., as an element which is subsequently placed on and at least partially covers a sensor housing of a pressure sensor. The cover may thus completely or partially cover, for example, a reference pressure chamber which is entirely or partially accommodated in the sensor housing, and/or the cover may provide a portion of this reference pressure chamber. It is particularly preferable if the housing has at least one connecting element for a force-locking and/or form-locking connection of the cover to a sensor housing of the pressure sensor. In particular, this connecting element may include at least one clamping tab and/or at least one latching tab and/or at least one clamping opening and/or at least one latching opening, so that a clamp connection and/or a latch connection may be easily and quickly produced between the sensor housing and the cover in one assembly operation.

The channel is preferably provided with a cross section which prevents capillary effects. It is particularly preferable if the channel has a cross section of at least 2 mm$^2$, in particular at least 10 mm$^2$, preferably at last 20 mm$^2$ and particularly preferably 50 mm$^2$ or more. Furthermore, the channel may preferably have a length of at least 10 mm, preferably at least 15 mm or even at least 20 mm. However, other dimensions are also possible. In this way, the channel may provide, on the one hand, effective shielding of the opening and the filter diaphragm against the direct entry of contaminants and/or fluids, for example against water. On the other hand, the channel provides an adequate cross section for the inflow or outflow of gases to or from the opening during pressure compensation, while avoiding capillary effects.

As illustrated above, the pressure compensation unit may be used, in particular, in a pressure sensor for detecting a pressure in a measuring chamber. The measuring chamber may be, in particular, a fuel tank of a motor vehicle, other applications also being possible, however, as illustrated above. The pressure sensor includes at least one sensor element connected to the measuring chamber, in particular at least one difference pressure sensor element. With regard to the sensor element, reference may be made, in principle, to all known sensor principles or combinations of different sensor principles. In addition to a sensor element for detecting a pressure, the pressure sensor may also include other sensor elements for detecting other types of parameters, for example temperatures or the like. The sensor element may be designed, in particular, as a micromechanical sensor element, for example having a sensor diaphragm, in particular a silicon diaphragm. The sensor principle may be based, in particular, on measurement by bending this sensor diaphragm, for example, due to expansion resistances and/or other sensors which may measure the deformation of the sensor diaphragm. With regard to the design of the sensor element, reference may be made, for example, to the aforementioned related art, in particular to Robert Bosch GmbH: "Sensoren im Kraftfahrzeug" (Sensors in Motor Vehicles), 2007 edition, pp. 128-130. The sensor element, in particular its sensor diaphragm, may be connected to the measuring chamber, for example directly or indirectly, for example via a measuring pressure supply means in the form of one or more holes, so that the measuring pressure of the chamber is applied to one side of the diaphragm. The sensor element further includes at least one reference pressure chamber which is connected to this sensor element and is isolated from the measuring chamber. This reference pressure chamber may be connected, for example, to the side of a sensor diaphragm which is diametrically opposite the measuring chamber. The pressure sensor further includes at least one pressure compensation unit according to one or more of the example embodiments described above, which may be directly or indirectly connected to the measuring chamber.

The proposed pressure compensation unit and the proposed pressure sensor have numerous advantages over known pressure compensation units and pressure sensors. Thus, the filter diaphragm may act as a pressure compensation diaphragm and provide overload protection, since faster and more reliable pressure compensation may be carried out. The filter diaphragm itself is protected against overload and may simultaneously provide fast pressure compensation between an environment and the reference pressure chamber. Furthermore, the described pressure compensation unit may be implemented in a comparatively small installation space. In contrast, for example, to the design described in published German patent application DE 10 2008 004 358, the example embodiment of the present invention ordinarily requires only installation space with regard to height, but not to length. At the same time, a sufficiently large opening for a channel and/or tunnel may be provided, in which water is unable to accumulate and/or adhere thereto due to capillary effects. Dirt and dust are also unable to block the sufficiently large opening in the channel. This enables the pressure sensor to breathe at all times. The filter diaphragm, which may be designed as a pressure compensation diaphragm, is protected against mechanical damage by situating the opening over which the filter diaphragm is located within the channel, which may be designed as a tunnel. The filter diaphragm may be situated, for example, largely parallel to a direction of the longitudinal extension of the channel. However, other types of orientation are also possible, in principle.

Due to the design of the pressure compensation unit, in which the channel formed by the opening closed by the filter diaphragm is located inside a housing, for example a cover, the filter diaphragm is better protected against mechanical damage than in known designs. Due to the possible "stacked" configuration of the filter diaphragm, for example above the current cover, only a height of an installation space is increased, but not the length of the sensor element. Due to the design of the channel, for example as a straight or bent tunnel, it is possible to ensure that the channel is open on both sides so that water and/or fluid medium may flow out through this channel, thus leaving the opening free. For example, the opening may be situated on an upper side of the channel, i.e., on a side which is situated above the channel when the pressure sensor is in the installed state. This may ensure that contaminants flowing or streaming through the channel are unable to adhere to the opening or the filter diaphragm.

The housing, for example the cover, having the at least one integrated channel and the opening, may be manufactured comparatively easily. For example, known and cost-effective plastic molding methods may be used, such as plastic injection molding, for example. The housing may be manufactured in a single operation.

DETAILED DESCRIPTION OF THE INVENTION

Figure 1:
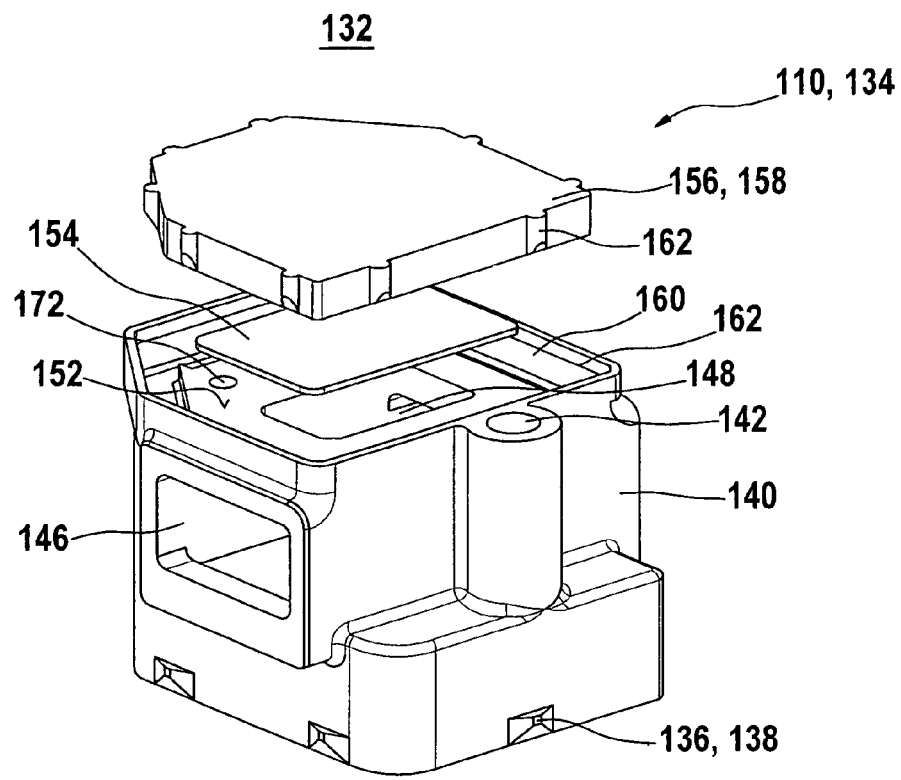
FIG. 1 shows a perspective view of a pressure compensation unit.

FIGS. 1 through 4 show different representations of an exemplary embodiment of a pressure compensation unit 110 according to the present invention by way of example. This pressure compensation unit may be used, for example, in a pressure sensor 112, which is shown in a perspective sectional representation in FIG. 5 and may be designed, in particular, as a fuel tank pressure sensor 114. Reference is made below to all figures, the functionality of pressure sensor 112 being described first on the basis of the representation in FIG. 5.

Pressure sensor 112 includes a sensor housing 116, which may be designed, for example, as an injection molded component. This component includes an electrical connector 118 for electrical contacting of pressure sensor 112. Pressure sensor 112 also has a connecting piece 120 having a measured pressure supply means 122 in the form of a pressure channel. Connecting piece 120 may be introduced into a wall of a measuring chamber 126, for example a fuel tank of a motor vehicle, via a gasket and/or a sealing cone 124, so that, for example, a fuel tank pressure may be detected via the measured pressure supply means 122. Pressure compensation unit 110 may be tightly connected, in particular, to sensor housing 116, in particular via an adhesive bond.

A sensor element 128, for example a micromechanical sensor element, for example a silicon pressure measuring chip, is accommodated in sensor housing 116.

The pressure of measuring chamber 126 is applied to this sensor element 128 from a measuring side. The sensor element 128 is connected to a reference pressure chamber 130 on a diametrically opposed side. Sensor element 128 may be configured, for example, to generate electrical pressure signals according to a difference pressure between measuring chamber 126 and reference pressure chamber 130 and to output the signals via connector 118. As an alternative or in addition, the sensor signals may also be processed entirely or partially in pressure sensor 112 itself.

Pressure compensation should take place between reference pressure chamber 130 and an environment 132 of pressure sensor 112. For this purpose, pressure sensor 112 has pressure compensation unit 110, designed as cover 134, which is shown in various detailed representations in FIGS. 1 through 4 and may be mounted on and connected to sensor housing 116. For connection purposes, cover 134 may include one or more connecting elements 136, which may be designed, for example, as clamping tabs 138 in the illustrated exemplary embodiment. Sensor housing 116 may include corresponding counter-elements which interact with connecting elements 136 and produce, for example a force-locking and/or form-locking connection. In principle, however, other types of connections are also possible.

Pressure compensation unit 110 includes a housing 140 which, in turn, may be manufactured, for example, as an injection-molded housing. Housing 140 may have a one-piece or multiple-piece design. As shown, for example, in FIG. 5, housing 140 designed as a cover 134 may include a cavity 144 on its lower end facing sensor housing 116, this cavity being open toward sensor housing 116 and forming reference pressure chamber 130 together with sensor housing 116 in the assembled state of pressure sensor 112 illustrated in FIG. 5.

Figure 4:
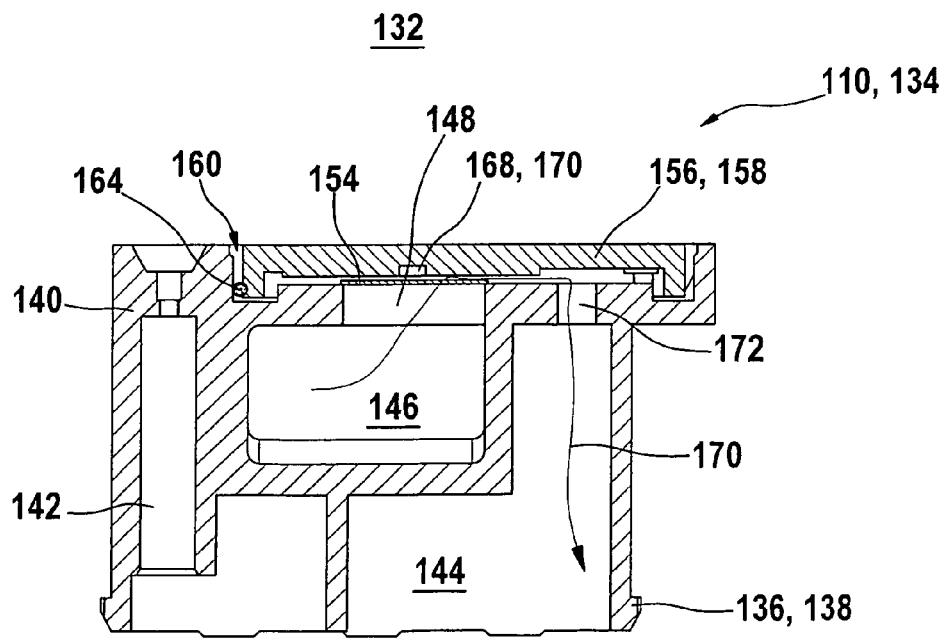
FIG. 4 shows a sectional representation perpendicular to the direction of the longitudinal extension of the channel.
Figure 5:
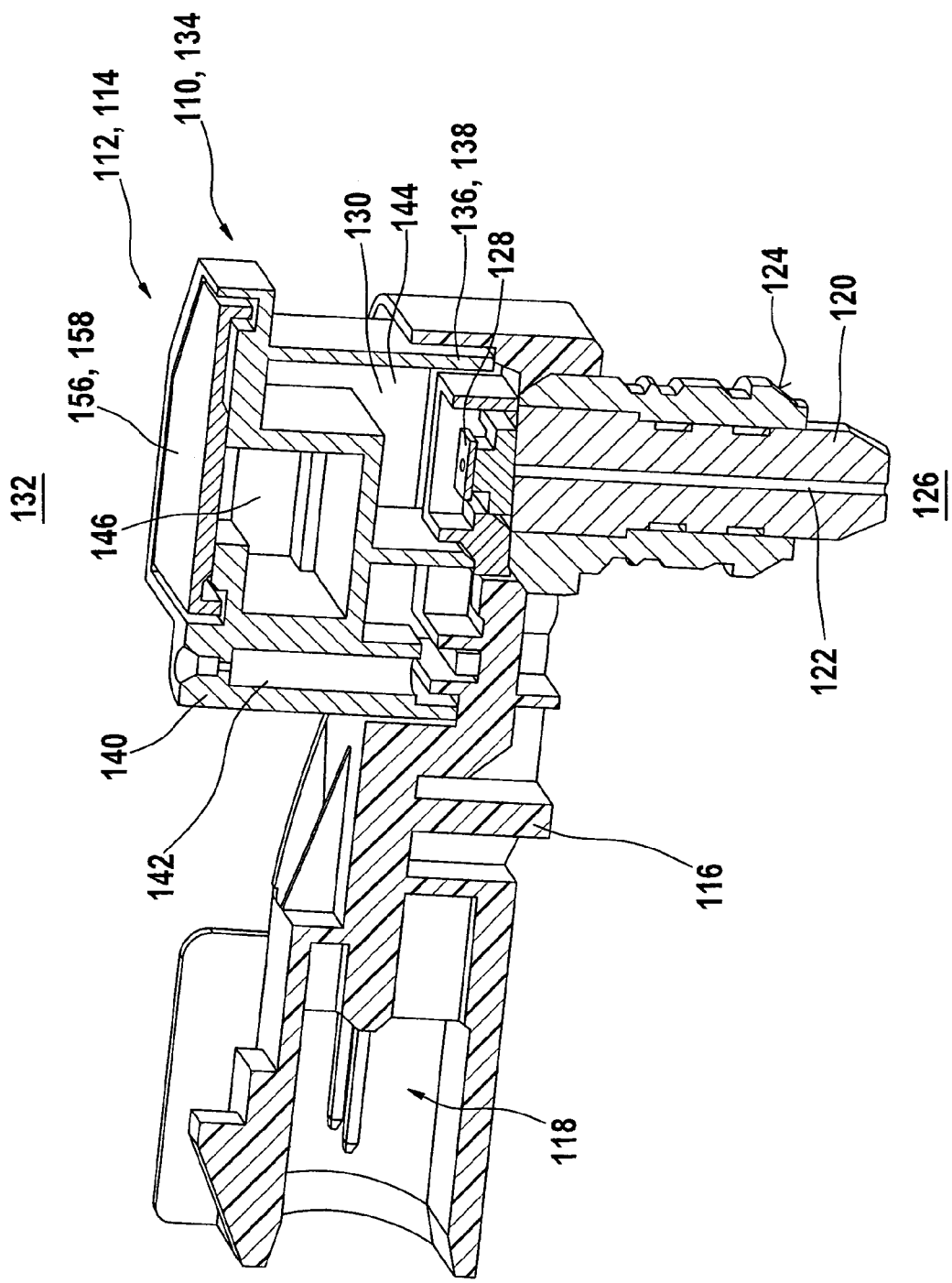
FIG. 5 shows a perspective sectional representation of a pressure sensor having a pressure compensation unit.

As is apparent in FIGS. 1, 4 and 5, a hole 142 may be provided in housing 140. This hole may be used, for example, at a ventilation, in particular during curing of an adhesive at a high temperature. Following this manufacturing step, hole 142 or an opening in this hole 142 may be closed and/or sealed, for example using a steel ball. However, hole 142 may also be dispensed with.

Figure 3:
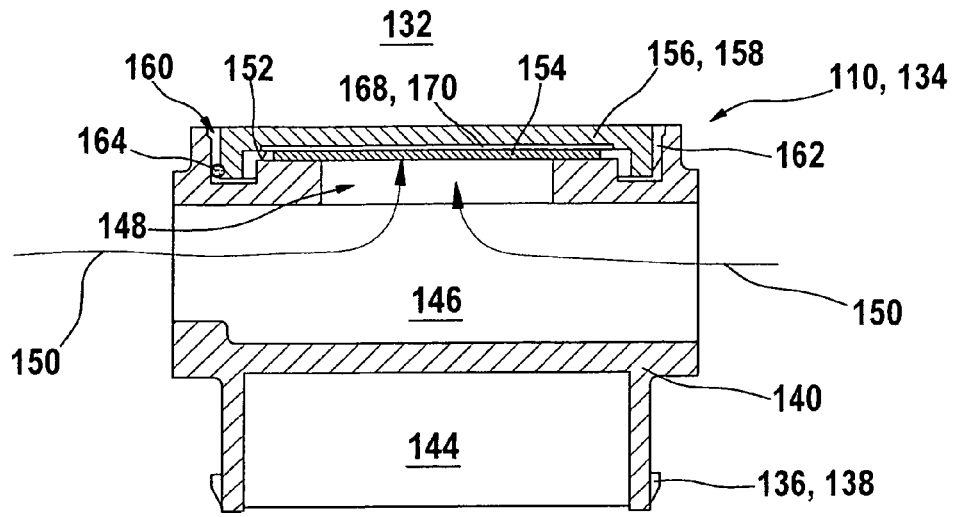
FIG. 3 shows a sectional representation of the pressure compensation unit in the sectional direction parallel to the direction of the longitudinal extension of a channel of the pressure compensation unit.

Furthermore, a channel 146 is provided in housing 140. In the illustrated exemplary embodiment, this channel 146 is designed as a continuous tunnel which is open on both sides as is apparent, for example, in the representation according to FIG. 3. FIG. 3 shows a sectional illustration of pressure compensation unit 110 in a sectional direction parallel to a direction of the longitudinal extension of channel 146, while FIG. 4 shows a sectional representation perpendicular to this longitudinal extension direction.

Furthermore, an opening 148, which acts as an inlet opening, is provided in housing 140 on an upper side of channel 146 facing away from sensor housing 116, in a wall of the channel. As is apparent, for example, in FIGS. 3 and 4, the width of this opening may cover half to three-quarters of the width of channel 146. Opening 148 preferably does not extend over the entire length of channel 146, as shown, in particular, in FIG. 3. As illustrated, in particular, in FIG. 3, opening 148 is freely accessible from two sides of channel 146, an air intake being identified symbolically by reference numeral 150 in FIG. 3. The direction of the air intake in FIG. 3 is randomly selected, since a pressure compensation may, in principle, take place in both directions.

As is apparent, in particular, in FIGS. 3 and 4 and in the perspective representation in FIG. 1, housing 140 has an elevated flat surface 152 on its upper side facing away from sensor housing 116 in the illustrated exemplary embodiment, opening 148 being situated on this flat surface. Opening 148 is closed by a filter diaphragm 154, which acts as a pressure compensation diaphragm and which may be glued onto flat surface 152 in the area of opening 148, so that opening 148 is completely closed. In the illustrated exemplary embodiment, flat surface 152 is situated in the area of an outside of housing 140. However, flat surface 152 is completely covered by a cover element 156 in the form of a cap 158 toward the outside and in the direction of environment 132. This cover element 156 is introduced, for example, into an indentation 160 in housing 140, and is connected to housing 140 via a clamp connection 162 and/or an adhesive bond 164, so that flat surface 152 is completed isolated from environment 132 by cover element 156. Cover element 156 may be tightly connected to housing 140, for example via an adhesive bond.

Figure 2:
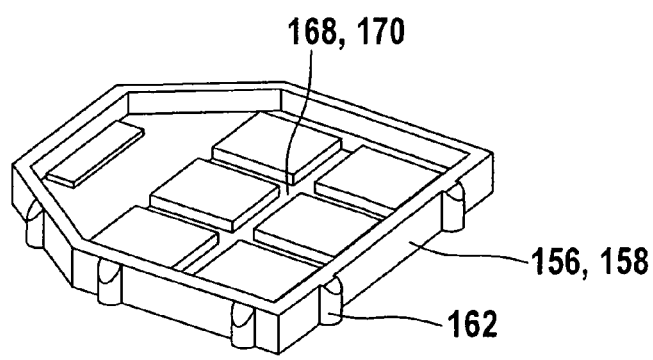
FIG. 2 shows a perspective representation of a cover element of the pressure compensation unit shown in FIG. 1.

In the illustrated exemplary embodiment, cover element 156 is located directly on filter diaphragm 154, making it possible to provide protection against an overload. FIG. 2 shows a perspective representation of cover element 156 in a view from housing 140. This illustration shows that cover element 156 may, for example, have air channels 168 in the longitudinal direction and/or lateral direction on its inside, facing housing 140. These air channels 168 may be used to support outflow and/or inflow of air from or to filter diaphragm 154. In this way, air may be exchanged between channel 146 or opening 148 and reference pressure chamber 144. In this case as well, the indicated flow direction of air passage 170 is, in turn, random, since pressure may be compensated in both directions.

In addition to air channels 168, air passage 170 in the illustrated exemplary embodiment also includes at least one air opening 172. In the illustrated example, this air opening 172 connects air channels 168 directly or indirectly to underlying reference pressure chamber 130 or cavity 144 in housing 140. On the whole, cavity 144 or reference chamber 130, in the assembled state of pressure sensor 112, is situated beneath channel 146 and, for example, on the side of channel 146 diametrically opposite opening 148. Air passage 170 thus partially surrounds channel 146. The stacked configuration, in which reference pressure chamber 130 or cavity 144 and channel 146 are situated on top of each other, may be implemented in a particularly space-saving manner. This makes it possible, on the one hand, to provide a compact pressure compensation unit 110, which, on the other hand, provides efficient shielding of air passage 170 for pressure compensation against contaminants and/or moisture as well as against direct mechanical damage.

What is claimed is:

1. A pressure compensation unit for a pressure sensor, comprising:
   a housing having at least one continuous channel, wherein at least one opening is provided in a wall of the at least one continuous channel, and wherein the at least one opening is connected to a reference pressure chamber of the pressure sensor via at least one air passage in the housing; and
   at least one gas-permeable and fluid-tight filter diaphragm, wherein the at least one opening provided in the wall of the at least one continuous channel is closed by the at least one gas-permeable and fluid-tight filter diaphragm.

2. The pressure compensation unit as recited in claim 1, wherein the at least one filter diaphragm is covered by at least one cover element.

3. The pressure compensation unit as recited in claim 2, wherein the at least one air passage is formed at least partially by at least one of a gap and an air channel between the at least one filter diaphragm and the at least one cover element.

4. The pressure compensation unit as recited in claim 3, wherein the at least one air passage further includes at least one air opening in the housing, wherein the at least one air opening connects the at least one of the gap and the air channel to the reference pressure chamber.

5. The pressure compensation unit as recited in claim 4, wherein the reference pressure chamber is at least partially situated in the housing.

6. The pressure compensation unit as recited in claim 4, wherein the at least one filter diaphragm is situated substantially parallel to a direction of the longitudinal extension of the at least one continuous channel of the housing.

7. The pressure compensation unit as recited in claim 1, wherein the at least one opening in the wall of the at least one continuous channel is situated on a side of the at least one continuous channel which is diametrically opposite the reference pressure chamber, and wherein the at least one air passage at least partially surrounds the at least one continuous channel within the housing.

8. The pressure compensation unit as recited in claim 7, wherein the housing is configured as a cover and has at least one connecting element for at least one of a force-locking and form-locking connection of the cover to a sensor housing of the pressure sensor.

9. The pressure compensation unit as recited in claim 7, wherein the at least one continuous channel has a cross section of at least 50 mm$^2$.

10. A pressure sensor for detecting a pressure in a measuring chamber, comprising:
    at least one sensor element connected to the measuring chamber;
    at least one reference pressure chamber connected to the sensor element and isolated from the measuring chamber; and
    a pressure compensation unit including:
      a housing having at least one continuous channel, wherein at least one opening is provided in a wall of the at least one continuous channel, and wherein the at least one opening is connected to the reference pressure chamber via at least one air passage in the housing; and
      at least one gas-permeable and fluid-tight filter diaphragm, wherein the at least one opening provided in the wall of the at least one continuous channel is closed by the at least one gas-permeable and fluid-tight filter diaphragm.

* * * * *